(12) United States Patent
Clarkson

(10) Patent No.: US 7,824,652 B1
(45) Date of Patent: Nov. 2, 2010

(54) ATS TAIL GAS TREATING PROCESS FOR SRU AND SWS OFF GASES

(75) Inventor: Mark P. Clarkson, Gilbert, AZ (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 0 days.

(21) Appl. No.: 12/351,811

(22) Filed: Jan. 9, 2009

(51) Int. Cl.
C01B 17/64 (2006.01)
B01J 10/00 (2006.01)
B01J 19/00 (2006.01)

(52) U.S. Cl. .......... 423/514; 423/519; 423/576.2; 423/221; 423/243.06; 422/129; 422/188

(58) Field of Classification Search .......... 423/514, 423/519, 576.2, 221, 243.06; 422/129, 188
See application file for complete search history.

(56) References Cited

U.S. PATENT DOCUMENTS 3,859,414 A * 1/1975 Urban .......... 423/222
6,534,030 B2 3/2003 Anderson et al. .......... 423/514

\* cited by examiner

*Primary Examiner* — Timothy C Vanoy
(74) *Attorney, Agent, or Firm* — Fennamore Craig, P.C.

(57) ABSTRACT

The present invention relates to a system and process utilizing ammonium thiosulfate solution (ATS) as the primary liquid absorption agent that is re-circulated through an SO2 Contactor/Absorber for high efficiency contacting and absorption of sulfur dioxide, $SO_2$ from a combustion gas stream generated by incineration of a Claus Sulfur Recovery Unit (SRU) off gas stream (often referred to as a Claus tail gas stream) and also additional $SO_2$ generated from incineration of additional sulfur containing streams. ATS is also re-circulated through a separate H2S Contactor/Absorber for absorption of and reaction with a Sour Water Stripper (SWS) off gas stream and additional H2S-Acid Gas (A.G.) streams to produce additional concentrated ATS. The process and equipment also provides the ability to readily switch between using ATS and ABS as the primary absorbent solution for $SO_2$ absorption, depending upon the concentration of $SO_2$ in the off gas feed streams.

20 Claims, 1 Drawing Sheet

ATS TAIL GAS TREATING PROCESS FOR SRU AND SWS OFF GASES

FIELD OF THE INVENTION

The present invention relates to methods and systems for the treatment of off-gasses generated by sulfur recovery processes in oil refinery and natural gas, coal, coke and biomass gasification plant operations, and for the recovery of sulfur and nitrogen-containing compounds generated by the foregoing.

BACKGROUND OF THE INVENTION

Oil refinery operations, in which crude oil is processed and naturally occurring sulfur and nitrogen compounds are removed from the crude oil, typically produce concentrated off-gas streams of hydrogen sulfide and ammonia. These concentrated tail gas streams may also be generated from processing natural gas and from coal, coke and biomass gasification operations. Oil refinery operations are increasingly faced with tail streams having increased contaminants, particularly sulfur and nitrogen, and there is increasing pressure on these operations to reduce the release of these contaminants into the environment and to provide purer refined products.

The off gas streams are typically further processed in one or more Sulfur Recovery Units ("SRU") to recover the sulfur and to destroy the ammonia. A Claus SRU is the most common type of SRU, and are generally used as the main SRU to recover sulfur and to limit $SO_2$ and other emissions. The Claus SRU off-gas is typically further treated in a Tail Gas Treating Unit ("TGTU") to recover the residual un-recovered sulfur, which is generally required by environmental regulations to be used to limit $SO_2$ and other emissions. The SCOT-TGTU process is typically used for this purpose, which involves thermal reduction of the Claus off-gas in order to convert the residual sulfur and sulfur compounds to hydrogen sulfide, and recycling it back to the Claus SRU for further sulfur recovery. Such further treatment in a SCOT-TGTU process is also needed to satisfy environmental regulations relating to the discharge of sulfur compounds into the environment. However, the SCOT-TGTU process is an energy- and process-intensive operation which very significantly adds to the cost of the overall sulfur recovery operation. It also reduces the total sulfur recovery capacity of the main Claus SRU due to the acid gas stream being recycled back to the Claus SRU, adding to the sulfur load.

Many processes have been developed for the recovery of sulfur dioxide in combustion gas streams to meet environmental requirements, but most require the addition of alkaline feed agents and generate waste products that are subject to additional disposal costs. For example, the process as described in U.S. Pat. No. 6,534,030 utilizes ammonium thiosulfate (ATS) as the absorption solution to absorb $SO_2$, producing a sulfite rich ATS solution which is further contacted with a feed gas containing hydrogen sulfide and ammonium to form an ammonium thiosulfate containing solution. This sulfite-rich ATS mixture however, is not directly pH controlled with additional ammonia and not continuously re-circulated through the $SO_2$ contactor with a separate re-circulating pump for maximum $SO_2$ recovery efficiency as is the process presented in this patent. Further, control of ATS production volume is limited to the available ammonia in the feed gas stream containing hydrogen sulfide and the ammonium. The available ammonia limits ATS production volume and limits the amount of $SO_2$ that can be absorbed. Also, control of the sulfur dioxide feed gas to match available ammonia and control absorption pH is problematic because of variations in upstream processes that ultimately generate the $SO_2$ gas feed rate. The process is limited to the available $NH_3$ in the $H_2S$ feed gas and must be controlled to meet the required molar ratios as shown in the well known overall reaction Equation 1:

$$6NH_3 + 4SO_2 + 2H_2S + H_2O \rightarrow 3(NH_4)_2S_2O_3 \qquad \text{Equation 1}$$

Typically SWS gas contains approximately equal molar ratios, 1:1 of hydrogen sulfide to ammonia which is the same ratio of sulfur to ammonia in the ATS product. U.S. Pat. No. 6,534,030 describes that unabsorbed $H_2S$ from line 78 can be directed to an incinerator for combustion to produce sulfur dioxide or to a Claus SRU. The total amount of $SO_2$ that can be absorbed and processed must be controlled to the $SO_2$:$NH_3$ molar ratio of 4:6. Any additional $SO_2$ to the process can not be accommodated. Control of $SO_2$ gas feed to the process through line 84 to maintain the required $SO_2$:$NH_3$ molar ratio is impractical when processing incinerated Claus SRU tail gasses. This is because both sulfur load to and sulfur recovery efficiency of the Claus SRU is highly variable and the incinerated Claus SRU tail gas will likely exceed the limited $SO_2$ that can be accommodated by the limited ammonia feed from the SWS gas in this ATS process.

ATS solutions may be produced by the reaction of a solution of ammonium sulfite with elemental sulfur or with sulfides including hydrogen sulfide gas or sulfides or polysulfides in aqueous solution, as described in Kirk-Othmer Encyclopedia of Chemical Technology. The basic process involves absorption and reaction of $SO_2$ with ammonia to produce an aqueous sulfite solution. The sulfur in this sulfite solution is ammonium sulfite $(NH_4)_2SO_3$ or ammonium bisulfite $NH_4HSO_3$, and usually a mixture of both forming a pH buffering solution. The sulfite sulfur in solution is an oxidized form of sulfur having an oxidation valence state of $S^{+4}$. This sulfite solution is then contacted and reacted with a reduced form of sulfur to produce ATS. The reduced sulfur can be elemental sulfur having a valence state of $S^0$ or sulfide sulfur having a valence state of $S^{-2}$ or polysulfide which contains a mixture of sulfur having valence states of $S^0$ and $S^{-2}$.

Many process variations utilizing different sources of sulfur and ammonia, different types of contacting and reacting equipment, different process flow schemes and a wide range of process conditions have been utilized for the production of ATS and many patents have been granted on these process variations. Most of these processes however are similar in that they use an ammonium sulfite solution as the primary $SO_2$ gas absorption solution, which is then further reacted to produce ATS.

SUMMARY OF THE INVENTION

Disclosed herein is a continuous process utilizing ammonium thiosulfate solution (ATS) as the primary absorption solution for the high efficiency absorption, reaction and recovery of sulfur and nitrogen containing gas components present in incinerated Claus Sulfur Recovery Unit (SRU) off-gas streams, incinerated $H_2S$ (Acid Gas or "A.G.") streams, un-incinerated Sour Water Stripper (SWS) off-gas streams and un-incinerated A.G. streams commonly generated by sulfur recovery operations in oil refinery and gas plant operations. The process recovers sulfur from the incinerated Claus SRU off-gas, additional sulfur from A.G. and SWS gas and also the ammonia in the SWS gas to produce an ATS product. The process serves as the Tail Gas Treating Unit (TGTU) for the Claus SRU to maximize total sulfur recovery and reduce sulfur emissions to a minimum.

The present invention relates to a system and process utilizing ammonium thiosulfate solution (ATS) as the primary liquid absorption agent that is re-circulated through an SO2 Contactor/Absorber for high efficiency contacting and absorption of sulfur dioxide, $SO_2$ from a combustion gas stream generated by incineration of a Claus Sulfur Recovery Unit (SRU) off-gas stream (often referred to as a Claus tail gas stream) and also additional $SO_2$ generated from incineration of additional sulfur containing streams. ATS is also re-circulated through a separate H2S Contactor/Absorber for absorption of and reaction with a Sour Water Stripper (SWS) off-gas stream and additional $H_2S$-acid gas (A.G.) streams to produce additional concentrated ATS. The process and equipment also provides the ability to readily switch between using ATS and ABS as the primary absorbent solution for $SO_2$ absorption, depending upon the concentration of $SO_2$ in the off gas feed streams.

Also disclosed herein is a process and system for producing ATS. The process disclosed herein provides an efficient way to produce valuable ATS. The final ATS product is controlled to contain a minimum of 12% nitrogen and 26% sulfur, also referred to as 60% ATS, and is primarily used as an agricultural fertilizer solution.

In the processes disclosed herein, the use of ATS as the primary absorption agent has the unique advantage of absorbing low concentrations of sulfur dioxide from the combustion gas streams at very high absorption efficiencies. The process flow equipment and process flow configuration accommodate a wide range of gas analysis, gas flow rates and flow ratios of the Claus SRU off gas, SWS off gas and A.G. feed streams that result from refinery and gas plant operations. This highly flexible ATS process allows for high efficiency recovery of sulfur and nitrogen components in the feed gas streams resulting in a vent stack gas that is well below environmental regulatory limits for $SO_2$ vented to the atmosphere. The ATS produced is a valued commercial product and is not a waste byproduct. The process arrangement allows for independent control of ATS production volume over a wide range to meet market demand.

In the primary ATS absorption mode of operation the process disclosed herein does not produce a sulfite solution as an intermediary product for further reaction to produce ATS. The ATS solution itself is the primary absorption solution used to absorb sulfur dioxide in the SO2 Contactor/Absorber. The resulting solution is a sulfite rich ATS solution which is then used in a separate H2S Contactor/Absorber to absorb and react with hydrogen sulfide and ammonia to produce additional ATS that is low in sulfite. This process uses a unique flow scheme to control the pH, sulfite content and ATS concentration of two separate ATS solutions being re-circulated through two separate contactor/absorbers with a controlled recycle ATS stream between the two contactor/absorbers to achieve optimum sulfur recovery efficiency, to accommodate changes in ATS production volume and to provide many other advantages discussed herein.

The process of the invention is not limited to the available ammonia in the SWS feed gas and does not limit the amount of $SO_2$ in the incineration $SO_2$ gas feed stream. The process is highly flexible and controllable using additional ammonia feed as required to control process pH and provide additional ammonia to accommodate the desired ATS production volume. In addition to incorporating some or all the ammonia supplied by the SWS gas feed stream the process more importantly is the Tail Gas Treating Unit (TGTU) for the Claus SRU providing high efficiency emissions control and additional SRU capacity while allowing for variable ATS production to meet market demand.

The ATS processes disclosed herein have many advantages including: utilizing some or all the ammonia in the SWS gas to supplement the required ammonia for ATS production; increasing the Claus SRU capacity by diverting the SWS from the Claus SRU directly to the ATS-TGTU; increasing the Claus SRU capacity by diverting some or in some cases even all the A.G. and SWS gas to the ATS unit where 100% SRU redundancy is required; increasing the Claus SRU capacity by eliminating any sulfur containing recycle stream back to the SRU; high sulfur recovery efficiency to satisfy emissions regulations; the versatility to adjust the ATS production rate to meet market demand; the versatility to adjust ATS analysis to obtain optimum product specifications of assay, sulfite, alkalinity and pH; the versatility to accommodate a wide range of $SO_2$ gas, A.G. and SWS gas stream analysis and flow rates. In addition, the process permits the minimization of oxidation and formation of ammonium sulfate. The process is forgiving in that the ATS solution used to absorb $SO_2$ in the SO2 Contactor/Absorber is far less solubility dependent on pH than other ATS processes using ammonium bisulfite (ABS) as the primary $SO_2$ absorption solution.

DETAILED DESCRIPTION

Figure 1:
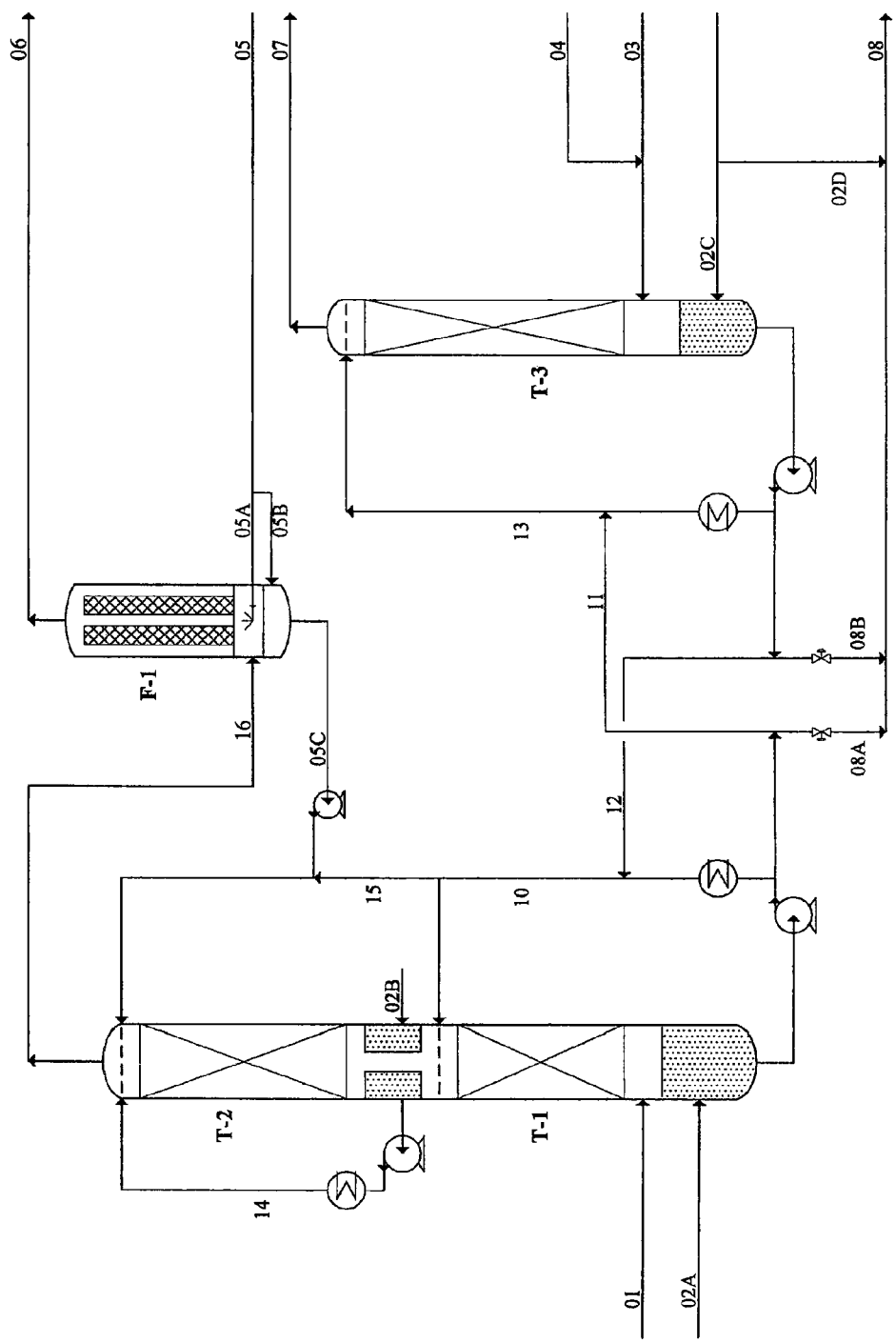
FIG. 1 is a schematic of an embodiment of the process of the invention.

This invention relates to an ATS tail gas treating process for recovery of Claus SRU Incineration Gas, Acid Gas and SWS off gasses containing $SO_2$, $H_2S$, $NH_3$, $O_2$, $N_2$, and $H_2O$ for the purpose of sulfur recovery, ammonia recovery, sulfur emissions control and ATS production. The process provides for continuous production of ammonium thiosulfate, $(NH_4)_2S_2O_3$, ("ATS"), as a concentrated (60%) aqueous solution for use in agricultural and other markets.

The process uses two primary gas/liquid contactor/absorbers for contacting, absorbing and reacting sulfur dioxide gas with ATS solution in the SO2 Contactor/Absorber and hydrogen sulfide and ammonia gas in a separate H2S Contactor/Absorber. ATS solution is the primary absorber solution and is continuously re-circulated through the SO2 Contactor/Absorber for $SO_2$ absorption and continuously re-circulated through the H2S Contactor/Absorber for $H_2S$ and $NH_3$ absorption. The separate recirculation loops have their own heat exchanger coolers and recirculation pumps.

In addition to the separate re-circulation streams for each absorber there is a shared recycle stream that circulates ATS between each absorber. This ATS recycle transports accumulated thiosulfate and ammonia from the H2S Absorber/Contactor to the SO2 Contactor/Absorber and accumulated sulfite from the SO2 Contactor/Absorber to the H2S Absorber/Contactor. If the ATS recycle stream is blocked then no ATS is transported between the two absorbers and the accumulated sulfite in the SO2 Contactor/Absorber becomes a concentrated solution of ammonium sulfite, $(NH_4)_2S_3$ and ammonium bisulfite $NH_4HSO_3$. This sulfite solution is sometimes referred to as "ABS". This ABS solution then becomes the contacting and absorption solution for the $SO_2$ gas. In this case, which is used in most prior art ATS production methods, the ABS solution is the intermediate solution that is further reacted to produce ATS. Termination of the ATS recycle flow between the two contactor/absorbers converts the process from the ATS absorption mode to the old established ABS absorption mode for the standard ATS production process.

It has been determined that at high ATS production rates with high volumes of concentrated $SO_2$ gas it may be advantageous to operate in the old standard ABS absorption mode. This is in part because higher $SO_2$ absorption loads cause higher concentrations of sulfite and lower pH in the ATS in the contact zone which can cause degradation of the ATS product forming some ammonium sulfate and ammonium dithionate. In this case the ATS absorption process is easily converted to the ABS absorption mode and the old standard ATS production process by simply blocking the ATS recirculation between the two contactor/absorbers.

This ability to convert to the old standard ATS production process makes this process very versatile and adaptable to a variety of feed stream conditions and production requirements. Additionally, ABS solution can be recovered from the SO2 Absorber/Contactor and sold as a separate product in addition to ATS. Also, the ABS solution can be stored and then reintroduced to the process at a later date to increase the ATS production rate at that time.

In the SO2 Contactor/Absorber, $SO_2$ is absorbed forming a sulfite rich ATS solution. Even though the ATS solution is rich in sulfite it is predominantly an ATS solution. The ATS acts to inhibit sulfite oxidation to sulfate. This enables the SO2 Contactor/Absorber to absorb $SO_2$ at low concentrations in the incineration gas stream even when there is a relatively large concentration of $O_2$ without appreciable oxidation of the contained sulfite to sulfate. The $SO_2$ absorption efficiency is especially high because the ATS absorption solution is controlled to a pH of about 6.0 or higher. Any unabsorbed $SO_2$ and $SO_3$ gas compounds are further absorbed in a SO2 Contactor/Scrubber for additional sulfur recovery if necessary. The sulfite rich ATS is then circulated to a separate H2S Contactor/Absorber where the $H_2S$ and $NH_3$ gas compounds in the SWS off gas and A.G. streams are absorbed by the ATS and reacted with the sulfite component to produce additional thio sulfate.

The process as described herein refers to FIG. 1, which is the process flow schematic of the basic process equipment and flow streams of the invention. Upstream, and not shown in the diagram, are the Claus SRU, Sour Water Stripper, Claus SRU off gas Incinerator, Incinerator Waste Heat Boiler, and the SO2 Incineration Gas Quench/Cooler. The incinerated Claus tail gas is typically cooled in a waste heat boiler and can be further cooled by quenching the hot $SO_2$ gas with a cool water spray to reduce its temperature and condense excess water vapor contained in the $SO_2$ gas feed stream. The $SO_2$ gas then enters the SO2 Contactor/Absorber (T-1) through line 01.

ATS pumped from the bottom of T-1 and re-circulated through line 10 contacts and absorbs the $SO_2$ from the $SO_2$ gas feed stream, which increases the sulfite content of the ATS, resulting in a sulfite-rich ATS solution at a reduced pH. Additional ammonia is supplied to T-1 to maintain the desired solution pH through line 02A and is also supplied by the inflow of the ammonia-rich ATS recycle stream through line 12 from T-3. Additional ammonia is supplied, through lines 02B, 02C and 02D, at various points to other locations in the process, to regulate pH and to supply makeup ammonia to accommodate ATS production volume if required.

The accumulated sulfite in the sulfite-rich ATS is transported out of the T-1 system and delivered to T-3 through the ATS re-cycle return line 11. ATS flow through line 12 makes up the recycle flow of low sulfite ATS from T-3 to T-1.

The gas exiting T-1 has very little remaining $SO_2$. Additional $SO_2$ absorption is obtained in the SO2 Contactor/Scrubber (T-2), if required. The gas enters T-2 where it is contacted with a re-circulated stream of dilute ATS scrubbing solution through line 14. Ammonia is added to the scrubbing solution to maintain pH through line 02B if required. The ATS in the T-2 scrubbing solution is delivered through line 15 and is diluted by process make up water coming from the gas filter F-1 through line 05C. The accumulated T-2 scrubber solution flows out of T-2 to T-1.

An alternative to operating T-2 with ATS in the scrubbing solution is to block off line 15 and operate with a dilute ammonium sulfite scrubbing solution formed from the make up water, absorbed $SO_2$ and ammonia. The advantage of incorporating ATS into the scrubbing solution is that it acts to inhibit oxidation of the sulfite component to form ammonium sulfate. Ammonium sulfate is not a desired component in the ATS solution because it reduces the contained sulfur concentration of a 60% solution and increases the temperature at which the ATS solution will start to crystallize. Some ammonium sulfate will usually be in the ATS solution but this ATS process will minimize ammonium sulfate formed from oxidation of the sulfite component. At higher ATS production rates and in the ABS absorption mode ATS is not used in T-2. The scrubbing solution generated by T-2 overflows to join the absorber solution in T-1.

The gas exiting T-2 passes through the Gas Filter F-1 where aerosol particles of ammonium sulfite and ammonium sulfate are captured before the gas is discharged. A small amount of water is injected into the gas stream through line 05A before the gas passes through the filter elements. This water acts to dissolve the aerosol particles and prevents plugging of the filter elements by solid particles. The solution drains from the filter elements and joins the balance of the required make up water supplied through line 05B to the bottom of F-1. The accumulated filter solution is transferred to T-2 through line 05C.

The SWS off gas is supplied to the H2S Contactor/Absorber (T-3) through line 03. Additional $H_2S$ if required can be supplied from an acid gas stream split off the main acid gas feed to the Claus SRU and diverted to T-3 through line 04. Both acid gas and SWS gas diverted from being processed by the Claus SRU to the ATS process reduces the sulfur feed load to the Claus SRU, and thus increases the available sulfur recovery capacity of the Claus SRU.

Additional acid gas may be split off the main acid gas stream and diverted from the Claus SRU to an incinerator. This will further increase the available capacity of the Claus SRU while increasing the $SO_2$ and ATS production rate. This process versatility provides the important advantage of increasing or decreasing ATS production volume to meet ATS market demand. It provides the further advantage of significantly increasing the Claus SRU capacity to cover surges in total sulfur feed or cover general increases in required total sulfur recovery capacity if desired. This important feature provides a way for the system and process to accommodate the treatment of off-gasses having variable or increasing volume flows and concentrations of contaminants.

The $H_2S$ and ammonia from the SWS gas and additional $H_2S$ from acid gas is contacted and absorbed by the ATS solution pumped from the bottom of T-3 and re-circulated through line 13. The contacting ATS solution is a combination of sulfite-rich recycle ATS solution delivered from T-1 through line 11, combined with a re-circulating stream of low sulfite ATS from T-3. The absorbed $H_2S$ reacts with the sulfite component in the ATS to produce additional ATS. The ammonia absorbed by the ATS is consumed in the reactions to form the additional ATS. Any additional ammonia, if required, can be supplied through line 02C and any excess ammonia is transported to T-1 with the recycle ATS through line 12.

The increased volume of ATS solution resulting from ATS produced by the process is taken off from either T-1 through line 08A, or T-3 through line 08B, or a combination of both, as desired, to meet optimum sulfite content of the finished ATS product. The ATS is then transported to storage through line 08.

DESCRIPTION OF A PREFERRED EMBODIMENT OF THE INVENTION

Referring to FIG. 1, T-1 is the SO2 Contactor/Absorber which contacts the $SO_2$ Gas stream delivered to the contactor through line 01. The sulfur dioxide combustion gas stream comes from the Claus off-gas incinerator through a waste heat boiler and gas quench cooler upstream of T-1 and is not shown in FIG. 1.

The $SO_2$ gas stream volume flow, $SO_2$ concentration and $O_2$ concentration are determined by the upstream Claus SRU off-gas flow and acid gas flow to the Incinerator. The temperature, pressure and $H_2O$ content of the $SO_2$ gas stream to T-1 is determined by the upstream waste heat boiler and gas quench operations. The ATS-TGTU plant can be designed to process a wide range of $SO_2$ concentrations and flow rates of the $SO_2$ gas feed, including $SO_2$ gas feed streams derived from the off-gas of three catalyst bed Claus units having a sulfur recovery efficiency of greater than about 97% all the way to about 0% Claus sulfur recovery efficiency for about 100% bypass of the Claus SRU. More preferably, the Claus SRU sulfur recovery efficiency is greater than about 50% using a thermal reactor only, to greater than about 97% using three additional catalyst beds.

The $SO_2$ gas quench operation is utilized in most cases for 2-3 bed Claus SRU operations where there is a limited amount of $SO_2$ available for ATS production, and more water vapor in the $SO_2$ gas than can be accommodated in a concentrated, 60% ATS solution. An alternative to the $SO_2$ gas quench operation, to condense out excess water vapor, is the use of an ATS evaporator/concentrator to evaporate the excess water out of an ATS produced at less than 60%.

A major advantage of this ATS-TGTU process is the ability to efficiently absorb the very low concentrations of $SO_2$ in the $SO_2$ gas derived from incineration of Claus tail gas of an efficient three catalyst bed Claus SRU. The low $SO_2$ concentration is too low to be efficiently absorbed by a concentrated sulfite solution in the prior art ATS process. However, the inventors determined that the ATS absorption solution as used in the present invention is well suited to efficiently absorb low concentrations of $SO_2$ from the $SO_2$ gas for four important reasons: First, the ATS solution's pH can be maintained much higher, preferably in the 6-7 pH range, significantly lowering the ATS solution's $SO_2$ equilibrium vapor pressure for more efficient $SO_2$ absorption efficiency, versus the 5-6 pH range for a concentrated sulfite/bisulfite solution. Second, the much lower sulfite concentration in the ATS solution versus the high sulfite concentration in a concentrated sulfite/bisulfite solution additionally reduces the $SO_2$ equilibrium vapor pressure over the ATS solution, further increasing the $SO_2$ absorption efficiency. Third, the concentrated ATS has a much higher solution solubility and is much less likely to precipitate crystals than a concentrated sulfite/bisulfite solution which will precipitate crystals if the pH is allowed to get to 6.0 or higher. Fourth, the ATS solution acts to inhibit oxidation of the sulfite component to form sulfate. This phenomenon is very useful in limiting ammonium sulfate in the ATS product when the $SO_2$ concentrations are low in relation to the $O_2$ concentrations in the $SO_2$ gas. This phenomenon of low oxidation rates of sulfite in ATS is possibly the result of ATS acting as a chemical oxidation inhibitor or a result of lower oxidation rates at higher pH or from low sulfite concentrations available to interact with $O_2$ or all of the above.

The $SO_2$ gas stream 01 enters the SO2 Contactor/Absorber and flows through the gas-liquid contact zone. Preferably, the $SO_2$ gas stream enters the SO2 Contactor/Absorber below the active contacting zone. Still more preferably, the $SO_2$ gas stream flows through the gas-liquid contact zone in a preferred counter current flow direction with the ATS absorption solution for optimum absorption efficiency, although co-current flow is also acceptable. The gas-liquid contacting can be accomplished with any acceptable type of contactor equipment including but not limited to a packed tower, tray tower, spray tower, venturi scrubber, static mixer or bubble column.

A re-circulating stream of ATS solution is the liquid stream used to contact and absorb the $SO_2$ from the $SO_2$ gas stream. This re-circulating ATS solution is typically pumped through a heat exchanger to cool the ATS solution and remove the heat of reaction caused by the absorption and reaction of the $SO_2$ with the alkalinity in the ATS solution, and the sensible heat from hot $SO_2$ gas, if not previously cooled in a quench operation. Cooling liquid, preferably water supplied by a cooling tower, is preferably used as an economical cooling media to the heat exchanger, although air cooled fin-fan heat exchangers can be used in addition to or in place of cooling water. The re-circulating ATS solution can be controlled to temperatures below about 100° F. to about 160° F. or higher but preferably to between about 100° F. and about 120° F. This temperature range conserves and retains the water in the ATS solution and minimizes water vapor condensation in the discharged vent stack gas to form a highly visible steam plume.

The alkalinity of the ATS solution is not due to the ammonium thiosulfate component, which is the major component in the ATS solution and is a neutral non-buffering ammonia salt. The alkalinity is associated with the ammonium sulfite $((NH_4)_2S_3)$ component in the ATS and is the active buffering salt that reacts with $SO_2$ to form ammonium bisulfite as shown in reaction Equation 2:

$$(NH_4)_2S_3 + SO_2 + H_2O \rightarrow 2NH_4HSO_3 \qquad \text{Equation 2}$$

The total sulfite concentration in the ATS solution is the sum of sulfite associated with ammonium sulfite plus ammonium bisulfite. The sulfite component is defined as the negative sulfite anion, $SO_3^{-2}$, and its concentration in ATS solution can be determined by standard analytical procedures and is typically reported as weight % $SO_3$ in the ATS solution.

The pH and alkalinity of the ATS solution declines and the sulfite content increases as it passes through the contacting zone and absorbs $SO_2$. This sulfite rich ATS is continuously re-circulated through the contacting zone to make contact with $SO_2$ in the gas. The sulfite concentration as weight percent $SO_3$ is maintained to less than about 10% and more than about 2% but more preferably between about 3% and about 6%. The sulfite concentration is controlled by increasing or decreasing the ATS recycle rate between T-1 and T-3 which transports sulfite-rich ATS out of T-1 to T-3 and low sulfite ATS from T-3 to T-1. The pH of the ATS entering the contact zone is less than about 8.0 and more preferably less than about 7.0. The pH of the ATS exiting the contact zone is less than about 7.0 and more preferably about 6.0. The pH and alkalinity of the ATS solution is maintained by the addition of ammonia to the ATS solution through line 02A which increases the pH and alkalinity and converts ammonium bisulfite to ammonium sulfite, as indicated in reaction Equation 3 below. Additionally the re-circulating ATS solution pH and alkalinity in T-1 is increased by the T-3 recycle ATS, which transports higher pH ATS from the H2S Contactor/Absorber (T-3) through line 12 to T-1.

$$NH_4HSO_3 + NH_3 \rightarrow (NH_4)_2SO_3 \quad \text{Equation 3}$$

Sulfite concentrations greater than about 10% are at risk of precipitating solid crystals, increased oxidation of the sulfite to sulfate and loss of ATS through decomposition reactions. Sulfite concentrations less than about 2% have low pH buffering capacity and large pH drops through the contact zone. Relatively high re-circulation flow rates through the contact zone not only increase $SO_2$ absorption efficiency but also help to minimize changes in ATS solution pH and sulfite content as it passes through the contact zone.

The gas exiting T-1 contact zone has very little remaining $SO_2$. Additional $SO_2$ absorption is obtained in a second stage SO2 Contactor/Scrubber (T-2), if required. Additionally, small amounts of ammonia may also be scrubbed out. The scrubber can be any suitable gas-liquid contactor but is more preferably a packed or spray tower. In a preferred embodiment, the gas enters T-2 where it is contacted with a re-circulated stream of dilute ATS scrubbing solution through line 14. Ammonia is added to the scrubbing solution to maintain pH through line 02B, if required. The pH is less than about 7.0 and greater than about 6.0 and more preferably about 6.6.

The ATS in the T-2 scrubbing solution is delivered through line 15 and is diluted by process make up water coming from the gas filter F-1 through line 05C. The accumulated T-2 scrubber solution overflows out of T-2 to T-1. An alternative to operating T-2 with ATS in the scrubbing solution is to block off line 15 and operate with the dilute ammonium sulfite scrubbing solution only. This scrubbing solution is formed from the normal makeup water coming from the F-1 through line 04C.

The advantage of incorporating ATS into the scrubbing solution is that it acts to inhibit oxidation of the absorbed $SO_2$ as ammonium sulfite to produce ammonium sulfate, as illustrated in reaction Equation 4:

$$(NH_4)_2SO_3 + O_2 \rightarrow 2(NH_4)_2SO_4 \quad \text{Equation 4}$$

The gas exiting T-2 passes through the gas filter F-1, where aerosol particles of ammonium sulfite, ammonium bisulfite and ammonium sulfate are captured by fiber bed filter elements before the gas is discharged. A small amount of water is injected into the gas stream through line 05B before the gas passes through the fiber bed filter elements. This water acts to dissolve the aerosol particles and prevents plugging of the fiber bed filter elements by solid particles. The solution drains from the filter elements and joins the balance of the required make up water in the bottom of F-1. This make up water is then transported to T-2 if T-2 is required, or to T-1 if T-2 is not required. The total makeup water is carefully controlled in order to control the ATS solution specific gravity to about 1.34 g/cc and a solution concentration of about 60%.

A portion of sulfite rich ATS solution is recycled to the H2S Contactor/Absorber T-3 through line 11 where it joins the T-3 re-circulation stream to contact $H_2S$ and ammonia supplied by the SWS feed through line 03 and additional $H_2S$ in an acid gas stream supplied through line 04. The $H_2S$ gas enters the absorber preferably below the active contacting zone and flows through the gas-liquid contact zone, preferably in a counter-current flow direction with the ATS absorption solution for optimum absorption efficiency. The gas-liquid contacting can be accomplished with any acceptable type of contactor equipment, including but not limited to a packed tower, tray tower, spray tower, venturi scrubber, static mixer or bubble column. In a preferred embodiment, a packed tower is used.

A re-circulating stream of ATS solution is the liquid stream used to contact and absorb the $H_2S$ and ammonia from the SWS and acid gas feed streams. The re-circulating ATS solution is typically pumped through a heat exchanger to cool and remove the heat of absorption and reaction for high ATS production rates when the old standard ATS production using ABS in T-1 is being employed. At lower ATS production rates using ATS as the primary $SO_2$ absorption solution the heat load in T-3 is very low and little or no cooling is required. The temperature is normally higher than about 110° F. and more preferably about 130° F. or even higher. The higher temperature increases the reaction rate between the absorbed $H_2S$ and the residual sulfite in the ATS to help insure that there is no absorbed but un-reacted $H_2S$ carried to T-1 in the recycle stream 12. Un-reacted $H_2S$ in the ATS recycle to T-1 may cause $H_2S$ emissions in the stack vent gas if precautions are not taken to control a positive sulfite content and reaction temperature in T-3.

The sulfite rich ATS solution from T-1 is delivered to T-3 through line 11, preferably at a pH of about 6.0, and contains approximately even portions of ammonium sulfite and ammonium bisulfite. The absorption and reaction of $H_2S$ with the sulfite components in the ATS to form additional ATS is shown in reaction Equation 5:

$$2(NH_4)_2S_3 + 2NH_4HSO_3 + 2H_2S \rightarrow 3(NH_4)_2S_2O_3 \quad \text{Equation 5}$$

At higher ATS production rates, additional $H_2S$ feed to T-3 is required from the acid gas supply through line 04. Sufficient $H_2S$ is required to react with most of the sulfite transported to T-3 from T-1. The residual un-reacted sulfite content as % $SO_3$ is maintained at less than about 5% and more than about 1% but preferably about 2.5%. Ammonia is supplied to T-3 in the SWS gas and additional ammonia is added if required through line 02C to maintain the pH above about 6.5 and below about 8.0, but more preferably about 7.3. The residual sulfite, as a mixture of ammonium sulfite and ammonium bisulfite, absorbs ammonia to become primarily ammonium sulfite at a pH of 7.3. This pH is also desirable in the ATS product to make the solution very slightly alkaline for corrosion control.

If excess ammonia is supplied by the SWS gas, it is essentially fully absorbed by the ATS solution. The ammonia will be retained in the ATS solution by converting residual un-reacted ammonium bisulfite to ammonium sulfite (see reaction Equation 3) and the excess $NH_3$ is absorbed and retained in solution as ammonium hydroxide which is transported to T-1 in the recycle ATS stream 12.

If excess $H_2S$ is supplied to T-3 by the SWS gas or A.G. it will not be fully absorbed, because the absorption rate is proportional to the available sulfite in the ATS solution, which reacts with the $H_2S$ to produce ATS, as shown in Equation 5 set forth above. As the sulfite is consumed in the reaction with $H_2S$ to produce ATS, the reduced sulfite concentration causes a reduction in the $H_2S$ absorption efficiency and reaction rate. As the sulfite concentration in the ATS approaches zero, the $H_2S$ absorption efficiency becomes very low. Unabsorbed $H_2S$ exits the contact zone, exits T-3 and becomes the $H_2S$ recycle gas in line 07. This excess $H_2S$ is delivered to the Incinerator where it is combusted to form additional $SO_2$, which goes to T-2 and ultimately returns to T-3 as additional sulfite. This conversion of excess $H_2S$ to $SO_2$ and its return as sulfite to T-3 increases the sulfite concentration in T-3, which reacts with more H₂S, reducing the excess H₂S. This creates a balance and a somewhat stable sulfite concentration in the ATS solution in T-3.

For higher ATS production rates when additional H₂S gas flow to T-3 is required, the concentration of sulfite in T-3 can be controlled to normal levels by controlling the H₂S gas flow to T-3. Lowering the H₂S feed rate increases the sulfite concentration in the ATS. The H₂S absorption and reaction rate is sufficiently high at normal sulfite concentrations in the 2-3% range such that only small amounts of H₂S are unabsorbed.

Additional control to maintain a desired sulfite concentration in the bottom of T-3 and reject excess H₂S may be obtained by simply controlling the ATS recirculation flow rate over the contact zone if necessary. At reduced recirculation flow there is less sulfite being delivered to the contact zone limiting the absorption and reaction of available H₂S to form thiosulfate. This increases the sulfite concentration in the retained ATS in the bottom of T-3. Increasing the recirculation flow to the contact zone delivers more sulfite to the contact zone, increases the absorption and reaction with the available H₂S and results in lower sulfite concentrations in the bottom of T-3.

When SWS gas is the major H₂S feed stream to T-3, the ATS will likely be high in alkalinity with excess ammonia. This excess ammonia in the ATS is in the form of ammonium sulfite and ammonium hydroxide. The excess ammonia is transported to T-1 through the ATS recycle line 12, where it is utilized for SO₂ absorption.

Up to 100% of the total ammonia supplied in the SWS gas can be used to supply up to 100% of the total ammonia required for the ATS produced. Additional ammonia is normally added to achieve desired ATS production rates and to control pH in the process.

In cases where the SWS gas contains objectionable quantities of odorous organic refinery compounds, the SWS gas can be diverted to the Claus SRU burner for combustion or alternatively be absorbed in a separate SWS Contactor/Absorber. Additional ammonia and water may be added as required to form a solution of ammonium sulfide, as shown in reaction Equation 6.

$$2NH_3 + H_2S \rightarrow (NH_4)_2S \qquad \text{Equation 6}$$

This solution can further be transferred to a storage vessel, where much of the organic material separates and is taken off and recycled back to refinery feed stocks. The separated ammonium sulfide solution is then delivered to T-3 in place of the SWS gas.

The final ATS product is taken off from either T-1 through line 08A or T-3 through line 08B, or a combination of both, as desired to meet optimum sulfite content of the finished ATS product, and is then transported to storage through line 08. A small amount of ammonia may also be added through line 02D if required to maintain optimum pH.

What is claimed:

1. A process for continuous production of a concentrated solution of ammonium thiosulfate (ATS) comprising the steps of:
   (a) contacting an SO₂ containing feed gas stream with a re-circulating liquid stream of ATS solution to absorb and react with the SO₂, to produce a sulfite rich ATS solution;
   (b) contacting an H₂S containing feed gas stream with a re-circulating liquid stream of ATS solution to absorb and react with the H₂S, to produce an ATS solution having a low sulfite content;
   (c) recycling the sulfite rich ATS solution produced in Step (a) to contact the H₂S containing feed gas stream of Step (b), and recycling the ATS solution having a low sulfite content produced in Step (b) to contact the sulfur dioxide containing feed gas stream of Step (a), to produce additional ATS having a high sulfite content; and
   (d) removing the ATS solution produced in Step (c) to obtain a concentrated solution of ATS having optimum sulfite concentration and pH.

2. The process of claim 1, wherein Step (a) occurs in a first reactor, Step (b) occurs in a second reactor, and Step (c) involves recycling the sulfite rich ATS solution from the first reactor to the second reactor, and recycling the ATS solution having a low sulfite content from the second reactor to the first reactor.

3. The process of claim 2, further comprising the steps of:
   quenching and cooling the SO₂ to remove excess water vapor;
   adding water to control specific gravity and solution concentration of the ATS solution to about 60%; and
   adding additional ammonia to the first and/or second reactors.

4. The process of claim 2 wherein the sulfite content of Step (b) in the second reactor is controlled by regulating the volume flow of the H₂S containing feed gas stream to the reactor.

5. The process of claim 2 wherein the sulfite content of the ATS in the first and/or second reactors is controlled by regulating the ATS re-circulation flow rate in each reactor and the ATS recycling flow rate between the reactors.

6. The process of claim 2 wherein the sulfite content of the ATS removed in Step (d) is controlled by blending low sulfite ATS from the second reactor with sulfite rich ATS from the first reactor.

7. A system for producing ammonium thiosulfate (ATS) comprising:
   (a) a first reactor for contacting S₂-containing gas with ATS to produce sulfite rich ATS;
   (b) a second reactor for contacting H₂S containing gas with ATS to produce low sulfite ATS;
   (c) a means for transporting sulfite rich ATS produced in the first reactor to the second reactor;
   (d) a means for transporting low sulfite ATS produced in the second reactor to the first reactor,
   wherein in the first reactor ATS absorbs SO₂ to produce sulfite rich ATS, and in the second reactor ATS absorbs hydrogen sulfide to produce low sulfite ATS.

8. A process for providing increased sulfur recovery capacity to a refinery sulfur recovery unit operation, comprising diverting one or more of the following gas streams away from the sulfur recovery unit to a reactor in which the gas stream is contacted with an ATS solution, wherein the gas streams are selected from the group consisting of: a sour water stripper gas stream or portion thereof and an H₂S acid gas stream or portion thereof;
   and are subjected to a process comprising the steps of:
   (a) contacting an SO₂ containing feed gas stream with a re-circulating liquid stream of ATS solution to absorb and react with the SO₂, to produce a sulfite rich ATS solution;
   (b) contacting the sour water stripper gas stream and/or the H₂S acid gas stream with a re-circulating liquid stream of ATS solution to absorb and react with H₂S in the sour water stripper gas stream and/or H₂S acid gas stream, to produce an ATS solution having a low sulfite content;
   (c) recycling the sulfite rich ATS solution produced in Step (a) to contact the sour water stripper gas stream and/or the H₂S acid gas stream of Step (b), and recycling the ATS solution having a low sulfite content produced in Step (b) to contact the sulfur dioxide containing feed gas stream of Step (a), to produce additional ATS solution having a high sulfite content; and (d) removing the ATS solution produced in Step (c) to obtain a concentrated solution of ATS.

9. The process of claim 2, wherein:

Step (c) further comprises ceasing recycling the low sulfite ATS solution from the second reactor to the first reactor, causing a buildup of ammonium bisulfite (ABS) solution in the first reactor, and further comprising contacting the $SO_2$ containing feed gas stream with a re-circulating recirculating liquid stream of ABS solution to absorb and react with the $SO_2$.

10. The process of claim 9, further comprising recycling the ABS solution from the first reactor to the second reactor.

11. The process of claim 9, further comprising reacting the ABS solution to produce a concentrated ATS solution.

12. The process of claim 1, wherein Step (c) comprises recycling a portion of the sulfite rich ATS solution produced in Step (a) and recycling a portion of the ATS solution having a low sulfite content produced in Step (b).

13. The process of claim 1, wherein in Step (b) the $H_2S$ containing feed gas stream is selected from acid gas, sour water stripper off-gas, or a combination thereof.

14. The process of claim 2, wherein one or both of the first and second reactors is a reactor is selected from the group consisting of a packed tower, a tray tower, a spray tower, a venturi scrubber, a static mixer and a bubble column.

15. The system of claim 7, wherein one or both of the first and second reactors is a reactor is selected from the group consisting of a packed tower, a tray tower, a spray tower, a venturi scrubber, a static mixer and a bubble column.

16. The system of claim 7, further comprising a third reactor for scrubbing $SO_2$ containing gas exiting the first reactor.

17. The system of claim 16, wherein the third reactor is operated with a scrubbing solution of dilute ATS or dilute ammonium sulfate, and further comprising a means for transporting the scrubbing solution from the third reactor to the first reactor.

18. The system of claim 7, further comprising upstream of the first and second reactors one or more of the following: a Claus sulfur recovery unit, a sour water stripper, a Claus sulfur recovery unit off-gas incinerator, an incinerator waste heat boiler, and an $SO_2$ incineration gas quencher/cooler.

19. The system of claim 17, further comprising a filter for capturing particles from gas exiting the third reactor.

20. The process of claim 8, wherein the sulfur recovery unit is a Claus sulfur recovery unit.

* * * * *

UNITED STATES PATENT AND TRADEMARK OFFICE
CERTIFICATE OF CORRECTION

PATENT NO. : 7,824,652 B1  
APPLICATION NO. : 12/351811  
DATED : November 2, 2010  
INVENTOR(S) : Mark P. Clarkson It is certified that error appears in the above-identified patent and that said Letters Patent is hereby corrected as shown below:

Column 12, line 34, in Claim 7, the text "$S_2$" should be changed to --$SO_2$--.

Signed and Sealed this
Eighth Day of March, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,824,652 B1 | Page 1 of 1 |
| APPLICATION NO. | : 12/351811 | |
| DATED | : November 2, 2010 | |
| INVENTOR(S) | : Mark P. Clarkson | |

It is certified that error appears in the above-identified patent and that said Letters Patent is hereby corrected as shown below:

In the Claims

Column 14, line 13, in Claim 17, the text "sulfate" should be changed to -- sulfite --.

Signed and Sealed this
Twenty-second Day of July, 2014

Michelle K. Lee
*Deputy Director of the United States Patent and Trademark Office*

US007824652C1

(12) EX PARTE REEXAMINATION CERTIFICATE (10134th)
United States Patent
Clarkson

(10) Number: US 7,824,652 C1
(45) Certificate Issued: Apr. 25, 2014

(54) ATS TAIL GAS TREATING PROCESS FOR SRU AND SWS OFF GASES

(75) Inventor: Mark P. Clarkson, Gilbert, AZ (US)

(73) Assignee: Tessenderlo Kerley, Inc., Phoenix, AZ (US)

Reexamination Request:
No. 90/012,677, Sep. 15, 2012

Reexamination Certificate for:
Patent No.: 7,824,652
Issued: Nov. 2, 2010
Appl. No.: 12/351,811
Filed: Jan. 9, 2009

Certificate of Correction issued Mar. 8, 2011

(51) Int. Cl.
*B01J 10/00* (2006.01)
*B01J 19/00* (2006.01)
*C01B 17/64* (2006.01)

(52) U.S. Cl.
USPC ...... 423/514; 423/221; 423/243.06; 423/519; 423/576.2; 422/129; 422/609

(58) Field of Classification Search
None
See application file for complete search history.

(56) References Cited

To view the complete listing of prior art documents cited during the proceeding for Reexamination Control Number 90/012,677, please refer to the USPTO's public Patent Application Information Retrieval (PAIR) system under the Display References tab.

*Primary Examiner* — Jerry D Johnson

(57) ABSTRACT

The present invention relates to a system and process utilizing ammonium thiosulfate solution (ATS) as the primary liquid absorption agent that is re-circulated through an SO2 Contactor/Absorber for high efficiency contacting and absorption of sulfur dioxide, $SO_2$ from a combustion gas stream generated by incineration of a Claus Sulfur Recovery Unit (SRU) off gas stream (often referred to as a Claus tail gas stream) and also additional $SO_2$ generated from incineration of additional sulfur containing streams. ATS is also re-circulated through a separate H2S Contactor/Absorber for absorption of and reaction with a Sour Water Stripper (SWS) off gas stream and additional H2S-Acid Gas (A.G.) streams to produce additional concentrated ATS. The process and equipment also provides the ability to readily switch between using ATS and ABS as the primary absorbent solution for $SO_2$ absorption, depending upon the concentration of $SO_2$ in the off gas feed streams.

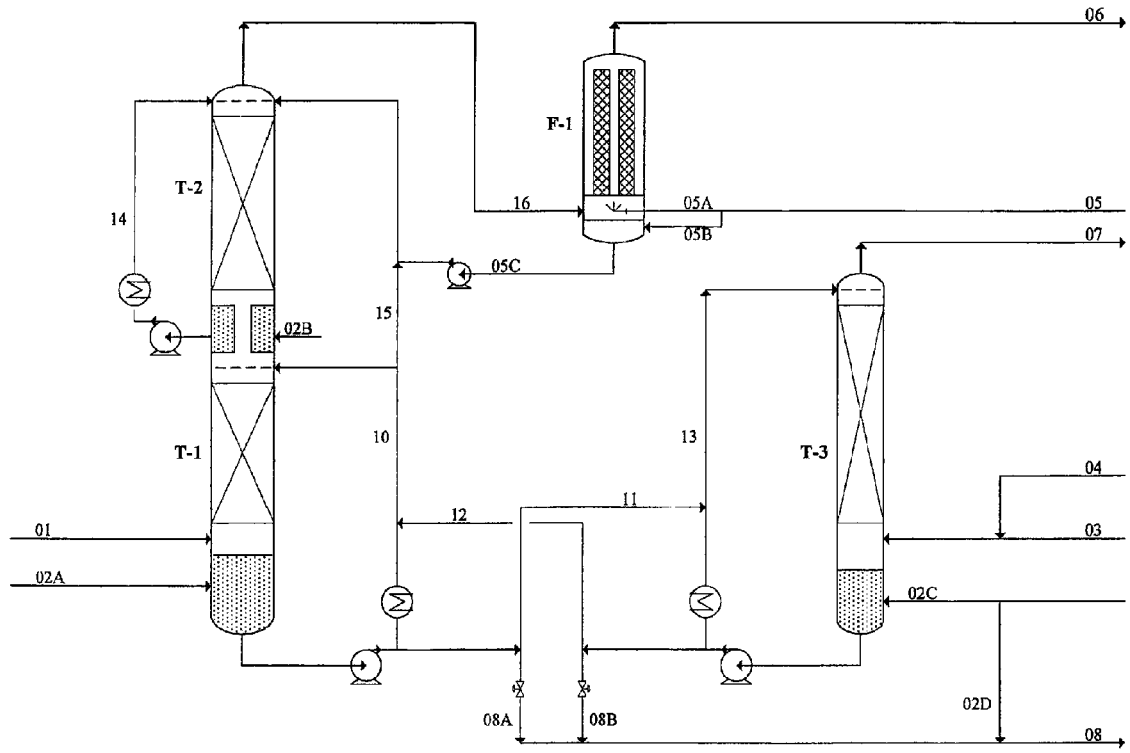

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6, 8-14 and 20 is confirmed.

Claim 7 is determined to be patentable as amended.

Claims 15-19, dependent on an amended claim, are determined to be patentable.

New claims 21-26 are added and determined to be patentable.

7. A system for producing ammonium thiosulfate (ATS) comprising:
   (a) a first reactor for contacting $SO_2$-containing gas with ATS to produce sulfite rich ATS, *the first reactor having a recirculation loop for re-circulating the ATS within the first reactor*;
   (b) a second reactor for contacting $H_2S$ containing gas with ATS to produce low sulfite ATS, *the second reactor having a recirculation loop for re-circulating the ATS within the second reactor*;
   (c) a means for transporting sulfite rich ATS produced in the first reactor to the second reactor;
   (d) a means for transporting low sulfite ATS produced in the second reactor to the first reactor,
   wherein in the first reactor ATS absorbs $SO_2$ to produce sulfite rich ATS, and in the second reactor ATS absorbs hydrogen sulfide to produce low sulfite ATS.

*21. The process of claim 1, wherein step (a) and step (b) further comprise supplying ammonia to each re-circulating liquid stream of ATS solution to control pH of the ATS solution.*

*22. The system of claim 7, further comprising means for introducing ammonia into the first reactor and into the second reactor.*

*23. The process of claim 8, wherein step (a) and step (b) further comprise supplying ammonia to each re-circulating liquid stream of ATS solution to control pH of the ATS solution.*

*24. The process of claim 1, wherein step (a) further comprises pumping the re-circulating liquid stream of ATS solution through a heat exchanger to cool the liquid stream.*

*25. The process of claim 24, comprising cooling the liquid stream to a temperature in the range of about 100° F. to about 160° F.*

*26. The process of claim 24, wherein step (b) further comprises pumping the re-circulating liquid stream of ATS solution through a heat exchanger to cool the liquid stream.*

* * * * *